US009489766B2

(12) United States Patent
Liu

(10) Patent No.: US 9,489,766 B2
(45) Date of Patent: Nov. 8, 2016

(54) POSITION SEARCHING METHOD AND APPARATUS BASED ON ELECTRONIC MAP

(71) Applicant: Tencent Technology (Shenzhen) Company Limited, Shenzhen (CN)

(72) Inventor: Long Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/364,565

(22) PCT Filed: May 24, 2013

(86) PCT No.: PCT/CN2013/076201
§ 371 (c)(1),
(2) Date: Jun. 11, 2014

(87) PCT Pub. No.: WO2013/178038
PCT Pub. Date: Dec. 5, 2013

(65) Prior Publication Data
US 2014/0300596 A1 Oct. 9, 2014

(30) Foreign Application Priority Data

May 28, 2012 (CN) .......................... 2012 1 0167958

(51) Int. Cl.
G06T 15/30 (2011.01)
G06T 3/00 (2006.01)
(Continued)

(52) U.S. Cl.
CPC ........... *G06T 15/30* (2013.01); *G06F 17/3087* (2013.01); *G06T 3/00* (2013.01); *G06T 7/602* (2013.01)

(58) Field of Classification Search
None
See application file for complete search history.

(56) References Cited

U.S. PATENT DOCUMENTS 840,202 A 1/1907 Davis
6,560,530 B1 * 5/2003 Yamada et al. ............... 701/532
(Continued)

FOREIGN PATENT DOCUMENTS

CN 1845094 10/2006
CN 102063652 5/2011
(Continued)

OTHER PUBLICATIONS

ITB CompuPhase, "Panoramic Image", 2000.*
WaybackMachine, Euclidean distance, 2011.*
Japanese office action.
Korean office action.

*Primary Examiner* — Mark Zimmerman
*Assistant Examiner* — Yu-Jang Tswei
(74) *Attorney, Agent, or Firm* — Morgan, Lewis & Bockius LLP

(57) ABSTRACT

The present invention relates to electronic maps, and provides a position searching method and apparatus based on an electronic map. The method includes: receiving a keyword of a searching object; searching the electronic map with the keyword to obtain a current geographical position; acquiring panoramic images of a plurality of scenes that are located within a geographical area around the current geo-geographical position and of a predetermined size; calculating coordinates of the searching object in one of the panoramic images according to position-related information of each scene; generating an image from an image area of the one of the panoramic images and outputting the image, wherein the image area is centered on the coordinates and of a predetermined size. The present invention can accurately position an image associated with the searching object, and has the advantages of low cost and less amount of data.

13 Claims, 6 Drawing Sheets

(51) Int. Cl.
  *G06T 7/60* (2006.01)
  *G06F 17/30* (2006.01)

(56) References Cited

U.S. PATENT DOCUMENTS

2008/0291217 A1* 11/2008 Vincent et al. ............... 345/629
2010/0118040 A1   5/2010 Lim
2011/0018865 A1   1/2011 Lee
2011/0058014 A1*  3/2011 Yamashita et al. ............ 348/36
2012/0076426 A1   3/2012 Kim et al.
2012/0299920 A1* 11/2012 Coombe et al. ............... 345/423

FOREIGN PATENT DOCUMENTS

| JP | 2008243027 | 10/2008 |
| JP | 2009065542 | 3/2009 |
| KR | 100946707 | 3/2010 |
| KR | 20100054057 | 5/2010 |
| KR | 20110068683 | 6/2011 |
| WO | 2008072429 | 6/2008 |

* cited by examiner

POSITION SEARCHING METHOD AND APPARATUS BASED ON ELECTRONIC MAP

FIELD OF THE INVENTION

The present invention relates to electronic maps, and more particularly to a position searching method and apparatus based on an electronic map.

BACKGROUND OF THE INVENTION

Statistical data shows that position searching, for example, searching the geographical position of shopping malls, hotels, and schools, or finding all the nearest restaurants and cinemas around the user, is the major need when users using electronic maps. As the technology develops, the results of position searching are becoming richer and richer. Except the accurate place can be positioned, additional text information such as addresses, telephone numbers, and comments, and image information can also be provided. Due to the visual and intuitive features, images are becoming an important manner for showing position-related information. However, in the known art, the images are mainly uploaded by users or searched from the web, and thus these images suffers from the following drawbacks.

1) These images have poor correlation to the searching object. For example, some images can't correctly show the position of the searching object, and evenly have none business of the searching object.

2) It is costly and of low efficiency to associate these images to correct positions. The images uploaded by users or searched from the web are full of randomness, and the data content is irregular. Thus, manual reviewing is necessary to associate these images to correct positions. Generally, the ratio of the approved images is very low.

SUMMARY OF THE INVENTION

Various embodiments of the present disclosure provide a position searching method and apparatus based on an electronic map, thereby solving the problems of high cost and low correlation in the process of associating images to geographical positions using the known position searching techniques.

In one embodiment, a position searching method is provided, and the method includes the following steps:
receiving a keyword of a searching object;
searching the electronic map with the keyword to obtain a current geographical position of the searching object;
acquiring panoramic images of a plurality of scenes that are located within a geographical area around the current geographical position and of a predetermined size;
calculating coordinates of the searching object in one of the panoramic images according to position-related information of each scene;
generating an image from an image area of the one of the panoramic images and outputting the image, wherein the image area is centered on the coordinates and of a predetermined size.

In one embodiment, a position searching apparatus is provided. The apparatus includes:
a keyword receiving unit, configured for receiving a keyword of a searching object;
a position obtaining unit, configured for searching the electronic map with the keyword to obtain a current geographical position of the searching object;
a panoramic image acquiring unit, configured for acquiring panoramic images of a plurality of scenes that are located within a geographical area around the current geographical position and of a predetermined size;
a coordinates calculating unit, configured for calculating coordinates of the searching object in one of the panoramic images according to position-related information of each scene;
an image outputting unit, generating an image from an image area of the one of the panoramic images and outputting the image, wherein the image area is centered on the coordinates and of a predetermined size.

The embodiments of the present invention obtain the current geographical position of the searching object from the electronic map according to the keyword. Then, panoramic images of a plurality of scenes that are located within a geographical area are obtained. After that, coordinates of the searching object in one of the panoramic images can be calculated according to position-related information of each of the scenes. Finally, an image is generated from an image area of the one of the panoramic images and outputted, wherein the image area is centered on the coordinates and of a predetermined size. The embodiments overcome the problems of the know position searching method for obtaining an image such as high cost and low correlation to the searching object. The above embodiments can accurately show image information for a geographical position. In addition, the above embodiments can be achieved at a low cost.

DETAILED DESCRIPTION OF PREFERRED EMBODIMENTS

To make the technical solutions and advantages of the present invention more apparently, embodiments of the present invention will be described in detail accompanying with figures as follows. It is to be noted that, the embodiments described here are used to illustrate the present invention, but are not intended to limit the present invention.

In the embodiments of the present invention, a current geographical position of a searching object is obtained from an electronic map according to a keyword of the searching object. Then, panoramic images of a plurality of scenes that are located within a geographical area around the current geographical position and of a predetermined size are acquired. After that, coordinates of the searching object in one of the panoramic images are calculated according to position-related information of all the scenes. Finally, an image is generated from an image area of the one of the panoramic images and outputted, wherein the image area is centered on the coordinates and of a predetermined size. As a result, the embodiments of the present invention are capable of accurately obtaining images of high correlation to the searching object from preserved panoramic images based on a low cost manner, and the image utilization ratio is improved.

The exemplary implementation of the present invention is described in detail below in conjunction with the specific embodiments.

Embodiment 1

Figure 1:
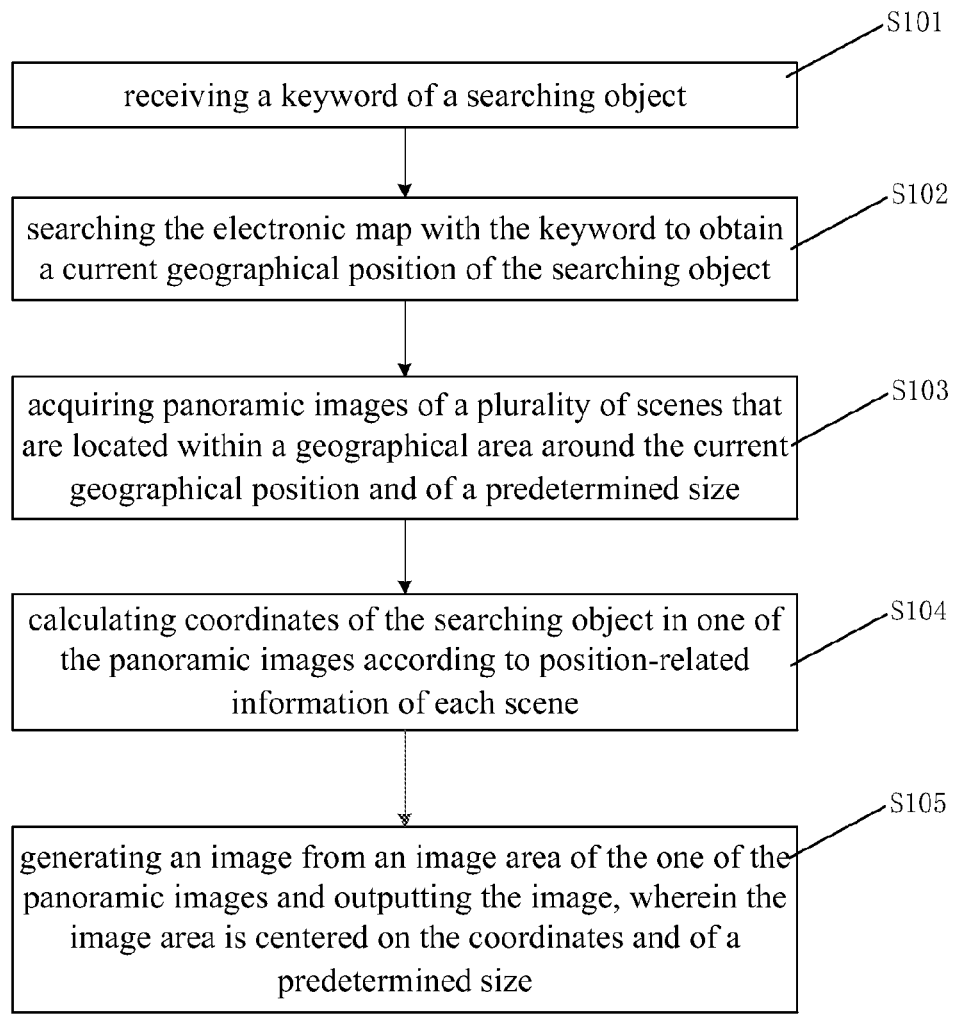
FIG. 1 illustrates a flow chart of a position searching method based on an electronic map in accordance with a first embodiment.

FIG. 1 illustrates a flow chart of a position searching method based on an electronic map in accordance with a first embodiment. The method is described in details as follows.

Figure 2:
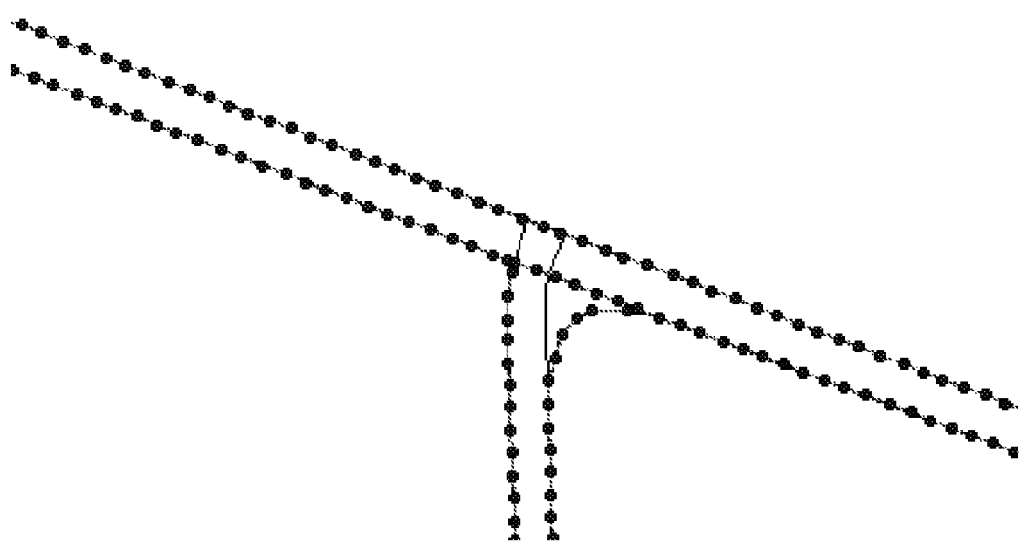
FIG. 2 is a schematic view showing all the scenes in a geographical area in accordance with an embodiment.

Panoramic images (i.e., 360-degree panoramic images) are images captured by panoramic cameras. As panoramic images are usually two-dimensional images transformed by a special projection, a special player may be used to project a panoramic image to generate a three-dimensional rendering for the user. By taking a lot of panoramic images at different positions (scenes) along a road or a street and combine these panoramic images together, a street view can be provided. Compared with general photos, the street view has the following advantages: 1) strong sense of immersion, and providing a fully immersive feeling for the user; 2) all the images have associated geographical information, which is convenient to position the images; 3) the images are taken along streets in batch, and thus covering a lot of positions; 4) it is convenient to generate an image, the production cycle is short, and the production cost is low. Because a street view has the above advantages, it is very suitable for producing position-related images. A street view is composed of a plurality of scenes arranged along a street, and each scene has location information describing a geographical position of the scene and a panoramic image centered on the geographical position. FIG. 2 shows all the scenes in a certain area of the street view. As shown in FIG. 2, the scenes are sequentially arranged along a road, and each dot represents the position of a corresponding scene. The distance between each two adjacent dots is even.

Figure 3:
FIG. 3 is a schematic view showing a panoramic image of a scene that is centered on a head of a car in accordance with an embodiment.

FIG. 3 shows a stitched 360-degree panoramic image of a scene that is centered on a head of a car. The panoramic image has a width of w and a height of h, with w and h being equal to the number of pixels of the panoramic image in the horizontal and vertical directions, respectively. The direction of the head of the car, or in other words, heading angle is $\theta_0$. From the left to the right, the heading angle ranges from 0 degrees to 360 degrees. Therefore, for any target, if the heading angle $\theta$ of the target in the panoramic image is given, a position (X, Y) of the target in the panoramic image can be calculated by the following formula (1):

$X=h/2;$ $Y=w/2+(\theta-\theta_0)*w/360;$ (1)

It is to be noted that the heading angle $\theta$ or $\theta_0$, the geographical position of the scenes should be described in a same coordinate system. In the present embodiment, the coordinate system is the map coordinate system. That is, a certain scene point is the center or in other words the original point, the north direction is the positive direction of the X axis, the south direction is the negative direction of the X axis, the west direction is the negative direction of the Y axis, and the east direction is the positive direction of the Y axis. Additionally, in the above formula (1), if the calculated result Y exceeds a range [0, w], "w" can be added or subtracted from Y until Y is in the range [0, w].

In step S101, a keyword of a searching object is received.

In step S102, a current geographical position of the searching

In a step S103, panoramic images of a plurality of scenes that are located within a geographical area around the current geographical position and of a predetermined size are acquired.

In a specific implementation process, when a user wants to obtain the geographical position of a searching object, a keyword related to the searching object can be inputted into the electronic map. For example, if the user wants to obtain the geographical position of "Jinrun Building" in a city, a keyword "Jinrun Building" can be inputted into the electronic map. At this point, the current geographical position of the searching object represented by the keyword "Jinrun Building", in other words, the geographical position outputted by the electronic map, is obtained. Thus, the specific location can be displayed in the electronic map, and simultaneously, additional information such as telephone numbers, names, addresses and traffic lines related to the searching object can also be displayed.

Furthermore, it is necessary to prepare panoramic images corresponding to the electronic map. The panoramic images are two-dimensional images corresponding to a plurality of scenes of a street view, and there is position-related information for all the scenes. The position-related information for each scene includes the width and height of a corresponding panoramic image, the geographical position and the heading angle of the scene. After obtaining the geographical position of the searching object, a plurality of scenes that are near to the current geographical position of the searching object may be obtained. The image information of the searching object can be viewed from all these scenes. However, the searching object can't be viewed from the scenes that are far away from the current geographical position. As the street view includes a great number of scenes, thus it is necessary to limit the scenes in a geographical area. The panoramic images of all the scenes in the geographical area include the searching object, in other words, the current geographical position of the searching object can be viewed from the panoramic images of the scenes in the geographical area. For example, the scenes can be limited in a circular area centered on the current geographical position. However, the area is not limited to this, and the user may set the area according to the practical requirements. Generally, the scenes that have a distance of less than 100 meters from the current geographical position can be selected. Then, the operation can only be performed on the scenes in the geographical area, and thus the amount of data is decreased and it is very suitable for some traffic sensitive applications such as mobile phones.

In a step S104, coordinates of the searching object in one of the panoramic images are calculated according to position-related information of each scene.

The step S104 may include the following steps:

obtaining a geographical position $(x_2, y_2)$ of a nearest scene of the current geographical position $(x_1, y_1)$ of the searching object according to the geographical position of each of the scenes in the geographical area;

calculating a heading angel $\theta=$a tan $2((x_2-x_1), (y_2-y_1))$ of the searching object in a panoramic image of the nearest scene according to the current geographic position and the geographic position of the nearest scene; and calculating the coordinates $(x_0, y_0)$ of the searching object in the panoramic image of the nearest scene according to the heading angle $\theta$ and position-related information of the nearest scene.

$(x_0, y_0)$ can be calculated referring to the above formula (1).

$$x0=h/2;$$

$$y0=w/2+(\theta-\theta_0)*w/360;$$

wherein h, w and $\theta_0$ represent the height, the width, and the heading angle of a panoramic image corresponding to the nearest scene, respectively, and $\theta$ represents a heading angle of the searching object.

Figure 4:
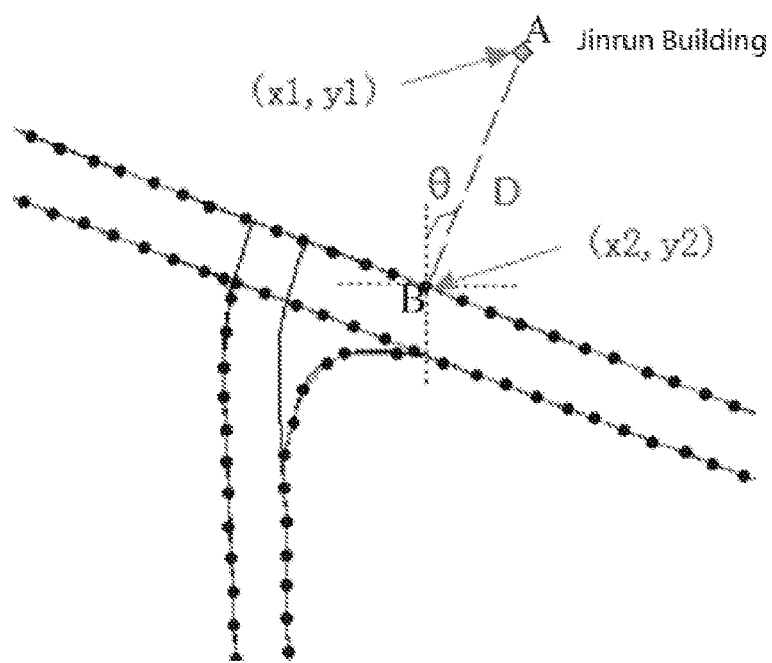
FIG. 4 is a schematic view showing a geographical position of a searching object and a scene in accordance with an embodiment.

In a specific implementation process, after obtaining the panoramic images of the scenes in the geographical area in step 103, the position-related information of all the scenes in the geographical area can further be obtained. Then, the distance between the geographical position of each scene and the current geographical position $(x_1, y_1)$ of the searching object can be calculated. Accordingly, the scene that has a minimum distance is selected as the above nearest scene, and the geographical position of this nearest scene is $(x_2, y_2)$. A distance between $(x_2, y_2)$ and $(x_1, y_1)$ can be calculated by the following formula: $D=\sqrt{(x2-x1)^2+(y2-y1)^2}$. The heading angle of the searching object in the panoramic image of the nearest scene can be calculated by the following formula: $\theta=a\tan 2((x_2-x_1), (y_2-y_1))$. As shown in FIG. 4, a dot A represents the geographical position of the searching object "Jinrun Building", a dot B represents the geographical position of a scene that is nearest to the dot A, a distance between A and B is D, and a heading angle of the searching object in the panoramic image is $\theta$. Combining with the width w, the height h, and the heading angle of the panoramic image of the scene at the dot B, the coordinates $(x_0, y_0)$ of the searching object "Jinrun Building" can be calculated.

In the present embodiment, after performing the step 104, the method may further includes the following step:

projecting the panoramic image to generate a three-dimensional image, and updating the panoramic image to the three-dimensional image.

In detail, because the panoramic images are two-dimensional images that are taken from the scene in the real world using cameras, the image finally displayed to the user is also a two-dimensional image if it is directly cut from the panoramic image but not projected to be a three-dimensional image first, and this could affect the visual effect of the displayed image. To enhance the user's experience, the panoramic image can be projected to output an image. As shown in FIG. 3, taking the panoramic image including "curved road" as an example, the road in the two-dimensional image is curved due to the panoramic projection. Actually, the "curved road" is straight. By projecting the panoramic image using a panoramic algorithm, an image without transformation and distortion can be obtained, and the obtained image can be displayed to the user for better visual effect.

In a step S105, an image is generated from an image area of the one of the panoramic images and outputted, wherein the image is centered on the coordinates and of a predetermined size.

Figure 5:
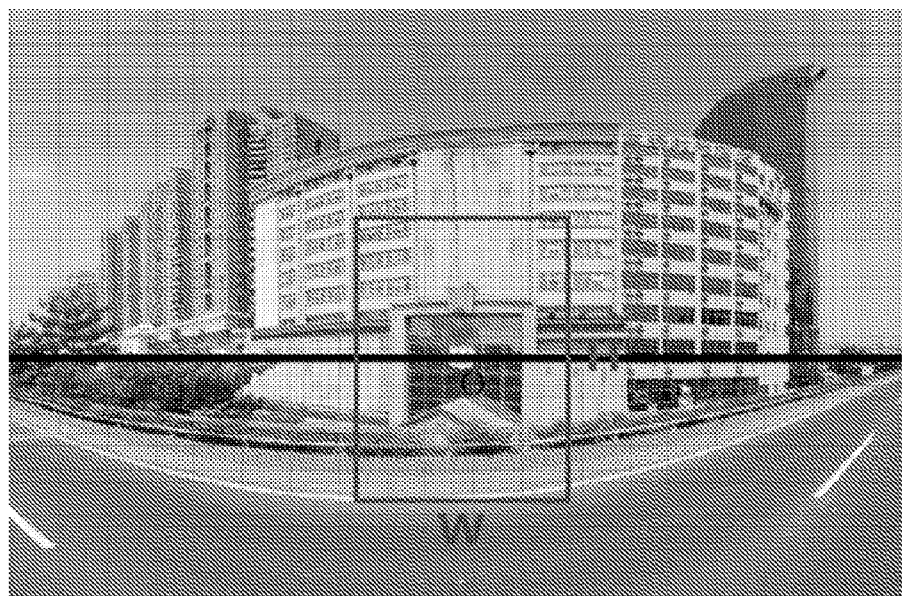
FIG. 5 is a schematic view showing a result of the position searching method based on an electronic map in accordance with an embodiment.

In a specific implementation process, the finally outputted image can be a part of the panoramic image that is in a circular area centered on the coordinates and having a designated radius, or in a rectangular area centered on the coordinates and having a designated width and height. If the image area is rectangular, a width W and a height H of the image area can be obtained by an empirical formula. For example, W=a/D, H=b/D, wherein a, b are predetermined empirical values, and $D=\sqrt{(x2-x1)^2+(y2-y1)^2}$. As shown in FIG. 5, the image in a rectangular frame is the image provided by the position searching method based on an electronic map in accordance with the present embodiment, and the image has the width of W, the height of H, and is centered on the dot O.

In the present embodiment, the position searching method calculates the coordinates of the searching object in the panoramic image of a nearest scene, according to the position-related information of each scene in the geographical area. Then, the method outputs an image generated from the image area that is centered on the coordinates and of a predetermined size. The method achieves the association of panoramic images and the searching object, provides an efficient and useful manner for visually expressing position-related information, and helps the user to quickly find a place in the real world. Also, the method has the advantages of low cost, less amount of data, and high accuracy of image association.

One skilled in the art would know that all or part of the steps in the above method can be achieved by instructing related hardware to finish with one or more programs. The programs can be stored in a computer readable medium, and examples of the computer readable medium include ROM, RAM, hard disk drives and compact disks.

Embodiment 2

Figure 6:
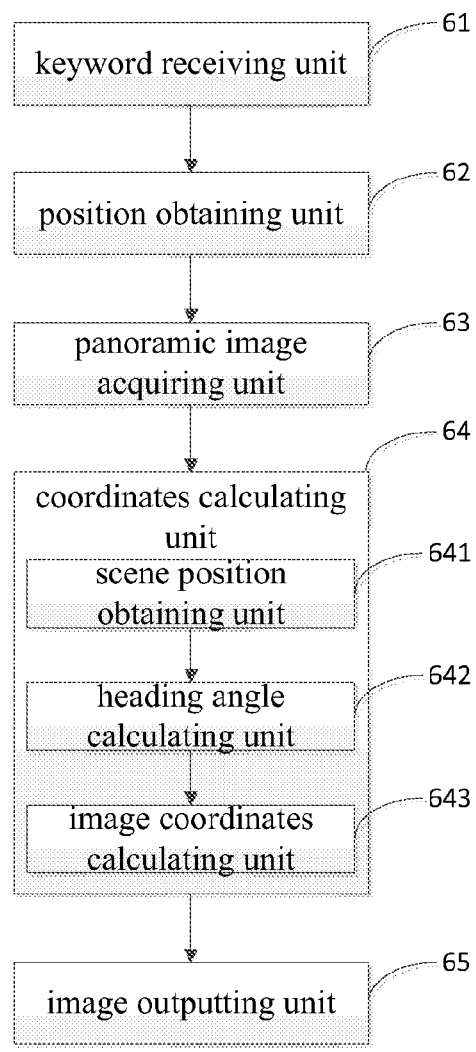
FIG. 6 is a block diagram of a position searching apparatus in accordance with a second embodiment.

FIG. 6 illustrates a block diagram of a position searching apparatus based on an electronic map in accordance with a second embodiment of the present invention. For convenience of description, only parts related to the embodiment of the present invention are shown.

The position searching apparatus based on an electronic map can be achieved in a terminal device having map searching function. In detail, the position searching apparatus may be a software module run by the terminal device, or an independent hardware integrated into the terminal device or run in an application system of the terminal device. The position searching apparatus includes a keyword receiving unit 61, a position obtaining unit 62, a panoramic image acquiring unit 63, a coordinates calculating unit 64 and an image outputting unit 65.

The keyword receiving unit 61 is configured for receiving a keyword of a searching object.

The position obtaining unit 62 is configured for searching the electronic map with the keyword to obtain a current geographical position of the searching object.

The panoramic image acquiring unit 63 is configured for acquiring panoramic images of a plurality of scenes that are located within a geographical area around the current geographical position and of a predetermined size.

In the present embodiment, the panoramic images are corresponding to a plurality of scenes that are located within a geographical area around the current geographical position and of a predetermined size, and the geographical position of the searching object can be view from these panoramic images. Thus, the finally outputted image associated with the searching object is more accurate. It is also not necessary to process all the panoramic images in a street view, and thus the workload of processing position searching is reduced.

The coordinates calculating unit 64 is configured for calculating coordinates of the searching object in one of the panoramic images according to position-related information of each scene.

The position-related information of the scene includes the width, the height and the heading angle of the panoramic image corresponding to the scene.

The coordinates calculating unit 64 may include:

a scene position obtaining unit 641, configured for obtaining a geographical position $(x_2, y_2)$ of a nearest scene of the current geographical position $(x_1, y_1)$ of the searching object according to the geographical positions of all the scenes in the geographical area.

a heading angle calculating unit 642, configured for calculating a heading angel θ of the searching object in a panoramic image of the nearest scene according to the current geographic position and the geographic position of the nearest scene; and an image coordinates calculating unit 643, configured for calculating the coordinates $(x_0, y_0)$ of the searching object in the panoramic image of the nearest scene according to the heading angle θ and position-related information of the nearest scene.

The image coordinates calculating unit 643 is configured to calculate the coordinates $(x_0, y_0)$ of the searching object according to the following formulas:

$$x0 = h/2;$$

$$y0 = w/2 + (\theta - \theta_0) * w/360;$$

wherein h, w and $\theta_0$ represent the height, the width, and the heading angle of a panoramic image corresponding to the nearest scene, respectively, and θ represents a heading angle of the searching object.

In the present embodiment, after obtaining panoramic images of the scenes in the geographical area, the geographical position of the nearest scene can be obtained according to the geographical position of each of the panoramic images using the scene position obtaining unit 641. The nearest scene is capable of accurately showing the geographical position of the searching object, and is also highly related to the searching object. During a practical operation process, if there are multiple nearest scenes for the searching object, generally, one of the nearest scenes whose panoramic image is facing towards the searching object can be selected as the nearest scene. As each scene has a previously prepared panoramic image centered on the scene, and the position-related information. Thus, the heading angle θ of the searching object in the panoramic image can be calculated according to the position-related information of the nearest scene and the current geographical position of the searching object using the heading angle calculating unit 642. Then, the coordinates $(x_0, y_0)$ of the searching object in the panoramic image can be calculated according to the height h (i.e., the number of pixels in the vertical direction), the width w (i.e., the number of pixels in the horizontal direction) of the panoramic image, the heading angle θ0 of the nearest scene using the image coordinates calculating unit 643. In a practical application, $(x_0, y_0)$ should be very close to, and ideally coincide with, the position of the searching object in the panoramic image. Thus, compared with the known art, the outputted position-related image is highly relative to the searching object.

The position searching apparatus may further include: a projection updating unit, configured for projecting the panoramic image to generate a three-dimensional image, and updating the panoramic image to the three-dimensional image.

In the present embodiment, the projection updating unit can achieve a better displayed effect for the image, and thus also enhances the user's experience.

The image outputting unit 65 is configured for generating an image from an image area of the one of the panoramic images and outputting the image, wherein the image area is centered on the coordinates and of a predetermined size.

The present embodiment provides a position searching apparatus based on an electronic map, which includes: a keyword receiving unit 61, a position obtaining unit 62, a panoramic image acquiring unit 63, a coordinates calculating unit 64 and an image outputting unit 65. The key word receiving unit 61 receives the keyword of the searching object. The position obtaining unit 62 searches the electronic map with the keyword to obtain a current geographical position of the searching object. The panoramic image acquiring unit 63 acquires panoramic images of a plurality of scenes that are located within a geographical area around the current geographical position and of a predetermined size. Thus, the panoramic image acquiring unit 63 limits the scope of the scenes should be considered. Additionally, the coordinates calculating unit 64 calculates coordinates of the searching object in the panoramic image of the nearest scene according to the height, width and heading angle of the panoramic images, and the heading angle of the searching object. Then, the image outputting unit 65 generates an image from an image area of the panoramic image and outputs the image, wherein the image area is centered on the coordinates and of a predetermined size. The position searching apparatus improves a correlation of the image to the searching object, reduces the cost of associating image to geographical positions, and also increases the utilization ratio of images.

The embodiments of the present invention obtain panoramic images in which the geographical position of the searching object can be viewed. Thus, the amount of the images that should be searched to find an image for a position is reduced. Further, a center of the image outputted can be positioned according to the position-related information of the nearest scene. Then, the image can be obtained by cutting a corresponding panoramic image according to a user designated area, and outputted to the user. The embodiments overcome the problems of the know position searching method for obtaining an image such as high cost and low correlation to the searching object. The above embodiments can accurately show image information for a geographical position, and therefore enable the user to find the geographical position of the searching object in a more quickly and accurately way. In addition, the above embodiments can be achieved at a low cost.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making a computing device implement the method recited in the examples of the present disclosure.

The above description is only illustrative embodiments of the present invention, and is not intended to limit the scope of the present invention. Any modifications, equivalent replacements and improvements in the spirit and principle of the present invention should also be included in the scope of the present invention.

What is claimed is:

1. A position searching method, based on an electronic map, the method comprising:
at an electronic device having one or more processors and a display;
receiving a keyword of a searching object;
searching the electronic map with the keyword to obtain a geographical position of the searching object;
acquiring a respective panoramic image of a scene that is located within a geographical area around the geographical position of the searching object;
calculating, according to position information of the scene, a distance between a geographical position of the panoramic image and the geographical position of the searching object;
generating an image from the panoramic image, wherein:
the generated image is centered on the geographical position of the searching object; and
the generated image is characterized by an area that is inversely proportional to the distance between the geographical position of the panoramic image and the geographical position of the searching object; and
outputting the generated image on the display.

2. The method of claim 1, wherein the position information of the scene includes a heading angle $\theta_0$ of the panoramic image; and the method further comprises:
calculating a heading angle $\theta$ of the searching object in the panoramic image according to the geographical position of the searching object, the geographical position of the panoramic image, and the heading angle of the panoramic image; and
calculating coordinates $(x_0, y_0)$ of the searching object in the panoramic image according to the heading angle $\theta$ and position information of the scene.

3. The method of claim 2, wherein calculating the coordinates $(x_0, y_0)$ of the searching object in the panoramic image according to the heading angle $\theta$ and position information of the scene comprises:
calculating $(x_0, y_0)$ according to the following formulas:

$$x_0 = h/2;$$

$$y_0 = w/2 + (\theta - \theta_0) \times w/360;$$

wherein h and w represent the height and the width of the panoramic image, respectively.

4. The method of claim 1, after calculating the distance between a geographical position of the panoramic image and the geographical position of the searching object and before generating the image:

projecting the panoramic image to generate a three-dimensional image, and
updating the panoramic image to the three-dimensional image.

5. An apparatus, based on an electronic map, comprising:
a display;
one or more processors; and
memory storing one or more programs including instructions that, when executed by the one or more processors, cause the apparatus to:
receive a keyword of a searching object;
search the electronic map with the keyword to obtain a geographical position of the searching object;
acquire a respective panoramic image of a scene that is located within a geographical area around the geographical position of the searching object, according to position information of the scene, a distance between a geographical position of the panoramic image and the geographical position of the searching object;
generate an image from the panoramic image, wherein:
the generated image is centered on the geographical position of the searching object; and
the generated image is characterized by an area that is inversely proportional to the distance between the geographical position of the panoramic image and the geographical position of the searching object; and
outputting the generated image on the display.

6. The apparatus of claim 5, wherein the position information of the scene includes a heading angle $\theta_0$ of the panoramic image.

7. The apparatus of claim 6, wherein the one or more programs further include instructions that cause the apparatus to:
calculate a heading angle $\theta$ of the searching object in the panoramic image according to the geographical position of the searching object, the geographical position of the panoramic image, and the heading angle of the panoramic image; and
calculate coordinates $(x_0, y_0)$ of the searching object in the panoramic image according to the heading angle $\theta$ and position information of the scene.

8. The apparatus of claim 7, wherein calculating the coordinates $(x_0, y_0)$ of the searching object in the panoramic image according to the heading angle $\theta$ and position information of the scene comprises:
calculating the coordinates $(x_0, y_0)$ of the searching object according to the following formulas:

$$x_0 = h/2;$$

$$y_0 = w/2 + (\theta - \theta_0) \times w/360;$$

wherein h and w represent the height and the width of the panoramic image, respectively.

9. The apparatus of claim 5, wherein the one or more programs further include instructions that cause the apparatus to:
project the panoramic image to generate a three-dimensional image, and update the panoramic image to the three-dimensional image.

10. A non-transitory computer readable storage medium storing one or more programs configured to be executed by a computer system, the one or more programs comprising instructions to:
receive a keyword of a searching object;
search the electronic map with the keyword to obtain a geographical position of the searching object;

acquire a respective panoramic image of a scene that is located within a geographical area around the geographical position of the searching object;

calculate, according to position information of the scene, a distance between a geographical position of the panoramic image and the geographical position of the searching object;

generate an image from the panoramic image, wherein:
 the generated image is centered on the geographical position of the searching object; and
 the generated image is characterized by an area that is inversely proportional to the distance between the geographical position of the panoramic image and the geographical position of the searching object; and output the generated image on the display.

11. The non-transitory computer readable storage medium according to claim 10, wherein the position information of the scene includes a heading angle $\theta_0$ of the panoramic image; and the one or more programs further comprise instructions to calculate a heading angle $\theta$ of the searching object in the panoramic image according to the geographical position of the searching object, the geographical position of the panoramic image, and the heading angle of the panoramic image; and calculate coordinates $(x_0, y_0)$ of the searching object in the panoramic image according to the heading angle $\theta$ and position information of the scene.

12. The non-transitory computer readable storage medium of claim 11, wherein calculating the coordinates $(x_0, y_0)$ of the searching object in the panoramic image according to the heading angle $\theta$ and position information of the scene comprises:

calculating the coordinates $(x_0, y_0)$ of the searching object according to the following formulas:

$$x_0 = h/2;$$

$$y_0 = w/2 + (\theta - \theta_0) \times w/360;$$

wherein h and w represent the height and the width of the panoramic image, respectively.

13. The non-transitory computer readable storage medium of claim 10, the one or more programs further comprising instructions to:

project the panoramic image to generate a three-dimensional image, and updating the panoramic image to the three-dimensional image.

* * * * *